(12) United States Patent
Tzannes et al.

(10) Patent No.: US 7,831,890 B2
(45) Date of Patent: Nov. 9, 2010

(54) RESOURCE SHARING IN A TELECOMMUNICATIONS ENVIRONMENT

(75) Inventors: Marcos C. Tzannes, Orinda, CA (US); Michael Lund, West Newton, MA (US)

(73) Assignee: Aware, Inc., Bedford, MA (US)

( * ) Notice: Subject to any disclaimer, the term of this patent is extended or adjusted under 35 U.S.C. 154(b) by 1123 days.

(21) Appl. No.: 11/246,163

(22) Filed: Oct. 11, 2005

(65) Prior Publication Data

US 2006/0088054 A1 Apr. 27, 2006

Related U.S. Application Data

(60) Provisional application No. 60/618,269, filed on Oct. 12, 2004.

(51) Int. Cl.
*H03M 13/00* (2006.01)
(52) U.S. Cl. .................. 714/774; 714/784; 375/222
(58) Field of Classification Search .................. 709/215; 375/222; 714/774, 784; 711/147, 153, 157, 711/170, 173; 379/93.01
See application file for complete search history.

(56) References Cited

U.S. PATENT DOCUMENTS

| 6,337,877 | B1 | 1/2002 | Cole et al. |
| 6,707,822 | B1 * | 3/2004 | Fadavi-Ardekani et al. ...... 370/395.5 |
| 6,775,320 | B1 | 8/2004 | Tzannes et al. |
| 6,778,589 | B1 | 8/2004 | Ishii |
| 6,778,596 | B1 | 8/2004 | Tzannes |
| 2003/0067877 | A1 | 4/2003 | Sivakumar et al. |
| 2004/0114536 | A1 | 6/2004 | O'Rourke |
| 2005/0180323 | A1 | 8/2005 | Beightol et al. |
| 2009/0300450 | A1 | 12/2009 | Tzannes |

FOREIGN PATENT DOCUMENTS

| EP | 1225735 | 7/2002 |
| EP | 1246409 | 10/2002 |
| WO | WO 03/063060 A | 7/2003 |
| WO | WO 2006/044227 | 4/2006 |

OTHER PUBLICATIONS

International Application WO 2006/04427 A1, published on Apr. 27, 2006.
PCT/US2005/036015—International Search Report, mailed Feb. 8, 2006.
http://www.sunrisetelecom.com/technotes/APP-xDSL-8B.pdf, "Sunset xDSL: Prequalification of ADSL Circuits with ATU-C Emulation" 2001, p. 3, Sunrise Telecom Inc., Application Series, San Jose, USA, XP002363272.

(Continued)

*Primary Examiner*—Joon H Hwang
*Assistant Examiner*—Mark Pfizenmayer
(74) *Attorney, Agent, or Firm*—Jason H. Vick; Sheridan Ross, P.C.

(57) ABSTRACT

A transceiver is designed to share memory and processing power amongst a plurality of transmitter and/or receiver latency paths, in a communications transceiver that carries or supports multiple applications. For example, the transmitter and/or receiver latency paths of the transceiver can share an interleaver/deinterleaver memory. This allocation can be done based on the data rate, latency, BER, impulse noise protection requirements of the application, data or information being transported over each latency path, or in general any parameter associated with the communications system.

8 Claims, 3 Drawing Sheets

OTHER PUBLICATIONS

Written Opinion for International (PCT) Patent Application No. PCT/US2005/036015, mailed Feb. 8, 2006.

International Preliminary Report on Patentability for International (PCT) Patent Application No. PCT/US2005/036015, mailed Apr. 26, 2007.

Examiner's First Report for Australian Patent Application No. 2005296086, mailed Jun. 24, 2009.

Notification of the First Office Action (including translation) for Chinese Patent Application No. 200580032703, mailed Sep. 25, 2009.

Shoji, T. et al: "Wireless Access Method to Ensure Each Users QOS in Unpredictable and Various QOS Requirements Wireless Personal Communications," Springer, Dordrecht, NL, vol. 22, No. 2, Aug. 2002, pp. 139-151.

"ITU-T Recommendation G.992.5—Series G: Transmission Systems and Media, Digital Systems and Networks", International Telecommunication Union, ADSL2, May 2003, 92 pages.

U.S. Appl. No. 12/783,758, filed May 20, 2010, Tzannes.
U.S. Appl. No. 12/760,728, filed Apr. 15, 2010, Tzannes.
U.S. Appl. No. 12/783,765, filed May 20, 2010, Tzannes.
U.S. Appl. No. 12/761,586, filed Apr. 16, 2010, Lund et al.

"ITU-T Recommendation G.992.3," International Telecommunication Union, ADSL2, Jan. 2005, 436 pages.

"VDSL2 ITU-T Recommendation G.993.2," International Telecommunication Union, Feb. 2006, 252 pages.

* cited by examiner

RESOURCE SHARING IN A TELECOMMUNICATIONS ENVIRONMENT

RELATED APPLICATION DATA

This application claims the benefit of and priority under 35 U.S.C. §119(e) to U.S. Patent Application No. 60/618,269, filed Oct. 12, 2004, entitled "Sharing Memory and Processing Resources in DSL Systems," which is incorporated herein by reference in its entirety.

BACKGROUND

1. Field of the Invention

This invention generally relates to communication systems. More specifically, an exemplary embodiment of this invention relates to memory sharing in communication systems. Another exemplary embodiment relates to processing or coding resource sharing in a communication system.

2. Description of Related Art

U.S. Pat. Nos. 6,775,320 and 6,778,589 describe DSL systems supporting multiple applications and multiple framer/coder/interleaver FCI blocks (an FCI block is also referred to as a latency path). DSL systems carry applications that have different transmission requirements with regard to, for example, data rate, latency (delay), bit error rate (BER), and the like. For example, video typically requires a low BER (<1E-10) but can tolerate higher latency (>20 ms). Voice, on the other hand, typically requires a low latency (<1 ms) but can tolerate BER (>1E-3).

As described in U.S. Pat. No. 6,775,320, different applications can use different latency paths in order to satisfy the different application requirements of the communication system. As a result a transceiver must support multiple latency paths in order to support applications such as video, Internet access and voice telephony. When implemented in a transceiver, each of the latency paths will have a framer, coder, and interleaver block with different capabilities that depend on the application requirements.

SUMMARY

One difficulty with implementing multiple latency paths in a transceiver is the fact that a latency path is a complicated digital circuit that requires a large amount of memory and processing power. An interleaver within a latency path can consume a large amount of memory in order to provide error correcting capability. For example, a typical DSL transceiver will have at least one latency path with approximately 16 kbytes of memory for the interleaver. Likewise, the coding block, for example, a Reed Solomon coder, consumes a large amount of processing power. In general, as the number of latency paths increase, the memory and processing power requirements for a communication system become larger.

Accordingly, an exemplary aspect of this invention relates to sharing memory between one or more interleavers and/or deinterleavers in a transceiver. More particularly, an exemplary aspect of this invention relates to shared latency path memory in a transceiver.

Additional aspects of this invention relate to configuring and initializing shared memory in a communication system. More particularly, an exemplary aspect of this invention relates to configuring and initializing interleaver/deinterleaver memory in a communication system.

Additional aspects of the invention relate to determining the amount of memory that can be allocated to a particular component by a communication system. More specifically, an exemplary aspect of the invention relates to determining the maximum amount of shared memory that can be allocated to one or more interleaves or deinterleavers.

According to another exemplary aspect of the invention, processing power is shared between a number of transceiver modules. More specifically, and in accordance with an exemplary embodiment of the invention, a coding module is shared between one or more coders and/or decoders.

Another exemplary embodiment of the invention relates to transitioning from a fixed memory configuration to a shared memory configuration during one or more of initialization and SHOWTIME (user data transmission).

An additional exemplary aspect of the invention relates to dynamically updating one or more of shared memory and processing resources based on changing communication conditions.

An additional exemplary aspect of the invention relates to updating one or more of shared memory and processing resources based on an updated communication parameter.

An additional exemplary aspect of the invention relates to updating the allocation of one or more of shared memory and processing resources based on an updated communication parameter(s).

Additional aspects of the invention relate to exchanging shared resource allocations between transceivers.

Additional exemplary aspects relate to a method of allocating shared memory in a transceiver comprising allocating the shared memory to a plurality of modules, wherein each of the plurality of modules comprise at least one interleaver, at least one deinterleaver or a combination thereof.

Still further aspects relate to the above method wherein the plurality of modules comprise interleavers.

Still further aspects relate to the above method wherein the plurality of modules comprise deinterleavers.

Still further aspects relate to the above method wherein the plurality of modules comprise at least one interleaver and at least one deinterleaver.

Additional exemplary aspects relate to a transceiver comprising a plurality of modules each including at least one interleaver, at least one deinterleaver or a combination thereof and a shared memory designed to be allocated to a plurality of the modules.

Still further aspects relate to the above transceiver wherein the plurality of modules comprise interleavers.

Still further aspects relate to the above transceiver wherein the plurality of modules comprise deinterleavers.

Still further aspects relate to the above transceiver wherein the plurality of modules comprise at least one interleaver and at least one deinterleaver.

These and other features and advantages of this invention are described in, or are apparent from, the following description of the embodiments.

BRIEF DESCRIPTION OF THE DRAWINGS

The embodiments of the invention will be described in detail, with reference to the following figures, wherein.

DETAILED DESCRIPTION

Figure 1:
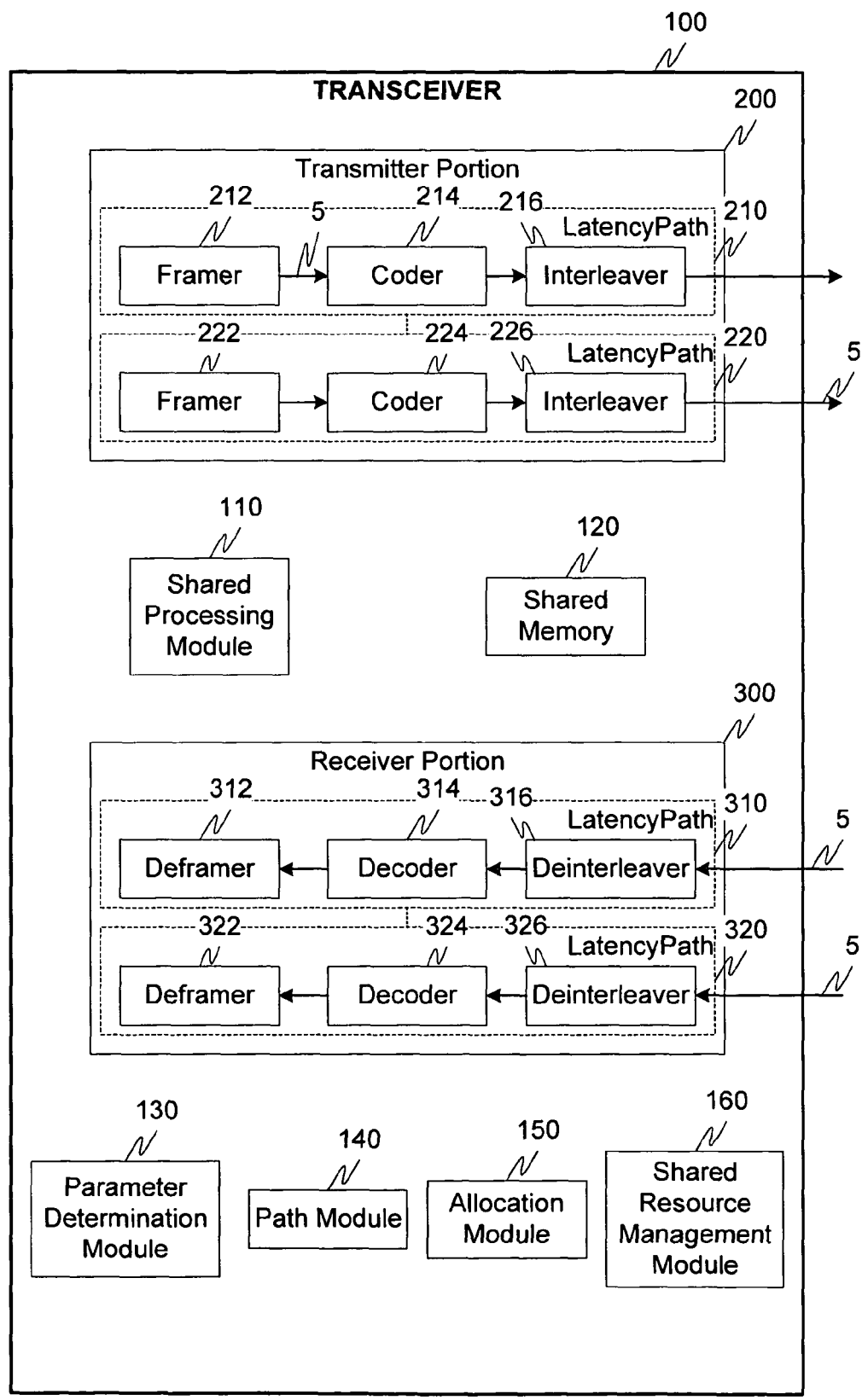
FIG. 1 is a functional block diagram illustrating an exemplary transceiver according to this invention.

The exemplary embodiments of this invention will be described in relation to sharing resources in a wired and/or wireless communications environment. However, it should be appreciated, that in general, the systems and methods of this invention will work equally well for any type of communication system in any environment.

The exemplary systems and methods of this invention will also be described in relation to multicarrier modems, such as DSL modems and VDSL modems, and associated communication hardware, software and communication channels. However, to avoid unnecessarily obscuring the present invention, the following description omits well-known structures and devices that may be shown in block diagram form or otherwise summarized.

For purposes of explanation, numerous details are set forth in order to provide a thorough understanding of the present invention. It should be appreciated however that the present invention may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a telecommunications network and/or the Internet, or within a dedicated secure, unsecured and/or encrypted system. Thus, it should be appreciated that the components of the system can be combined into one or more devices, such as a modem, or collocated on a particular node of a distributed network, such as a telecommunications network. As will be appreciated from the following description, and for reasons of computational efficiency, the components of the system can be arranged at any location within a distributed network without affecting the operation of the system. For example, the various components can be located in a Central Office modem (CO, ATU-C, VTU-O), a Customer Premises modem (CPE, ATU-R, VTU-R), a DSL management device, or some combination thereof. Similarly, one or more functional portions of the system could be distributed between a modem and an associated computing device.

Furthermore, it should be appreciated that the various links, including communications channel 5, connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique. FCI block and latency path are used interchangeably herein as well as transmitting modem and transmitting transceiver. Receiving modem and receiving transceiver are also used interchangeably.

FIG. 1 illustrates an exemplary embodiment of a transceiver 100 that utilizes shared resources. It should be appreciated that numerous functional components of the transceiver have been omitted for clarity. However, the transceiver 100 can also include the standard components found in typical communications device(s) in which the technology of the subject invention is implemented into.

According to an exemplary embodiment of the invention, memory and processing power can be shared among a plurality of transmitter and/or receiver latency paths, in a communications transceiver that carries or supports multiple applications. For example, the transmitter and/or receiver latency paths of the transceiver can share an interleaver/deinterleaver memory and the shared memory can be allocated to the interleaver and/or deinterleaver of each latency path. This allocation can be done based on the data rate, latency, BER, impulse noise protection requirements of the application, data or information being transported over each latency path, or in general any parameter associated with the communications system.

Likewise, for example, the transmitter and/or receiver latency paths can share a Reed-Solomon coder/decoder processing module and the processing power of this module can be allocated to each encoder and/or decoder. This allocation can be done based on the data rate/latency, BER, impulse noise protection requirements of the application data or information being transported over each latency path, or in general based on any parameter associated with the communication system.

In accordance with an exemplary operational embodiment, a first transceiver and a second transceiver transmit to one another messages during, for example, initialization which contain information on the total and/or shared memory capabilities of each transceiver and optionally information about the one or more latency paths. This information can be transmitted prior to-determining how to configure the latency paths to support the application requirements. Based on this information, one of the modems can select an FCI configuration parameter(s) that meets the transmission requirements of each application being transported over each latency paths. While an exemplary of the embodiment of the invention will be described in relation to the operation of the invention and characteristics thereof being established during initialization, it should be appreciated that the sharing of resources can be modified and messages transmitted between a two transceivers at any time during initialization and/or user data transmission, i.e., SHOWTIME.

FIG. 1 illustrates an exemplary embodiment of a transceiver 100. The transceiver 100 includes a transmitter portion 200 and a receiver portion 300. The transmitter portion 200 includes one or more latency paths 210, 220, . . . . Similarly, the receiver portion 300 includes one or more latency paths 310, 320, . . . . Each of the latency paths in the transmitter portion 200 includes a framer, coder, and interleaver designated as 212, 214, 216 and 222, 224 and 226, respectively. Each of the latency paths in the receiver portion includes a deframer, decoder, and deinterleaver designated as 312, 314, 316 and 322, 324, and 326, respectively. The transceiver 100 further includes a shared processing module 110, a shared memory 120, a parameter determination module 130, a path module 140, an allocation module 150, and a shared resource management module 160, all interconnected by one or more links (not shown).

In this exemplary embodiment, the transceiver 100 is illustrated with four total transmitter portion and receiver portion latency paths, i.e., 210, 220, 310, and 320. The shared memory 120 is shared amongst the two transmitter portion interleavers 216 and 226 and two receiver portion deinterleavers 316 and 326. The shared processing module 110, such as a shared coding module, is shared between the two transmitter portion coders 214 and 224 and the two receiver portion decoders 314 and 324.

While the exemplary embodiment of the invention will be described in relation to a transceiver having a number of transmitter portion latency paths and receiver portion latency paths, it should be appreciated that this invention can be applied to any transceiver having any number of latency paths. Moreover, it should be appreciated that the sharing of resources can be allocated such that one or more of the transmitter portion latency paths are sharing a shared resource, one or more of the receiver portion latency paths are sharing a shared resource, or a portion of the transmitter portion latency paths and a portion of the receiver portion latency paths are sharing shared resources. Moreover, any one or more of the latency paths, or portions thereof, could also be assigned to a fixed resource while, for example, another portion of the latency path(s) assigned to a shared resource. For example, in latency path 210, the interleaver 216 could be allocated a portion of the shared memory 120, while the coder 214 could be allocated to a dedicated processing module, vice versa, or the like.

In accordance with the exemplary embodiment, a plurality of transmitter portion or receiver portion latency paths share an interleaver/deinterleaver memory, such as shared memory 120, and a coding module, such as shared processing module 110. For example, the interleaver/deinterleaver memory can be allocated to different interleavers and/or deinterleavers. This allocation can be based on parameters associated with the communication systems such as data rate, latency, BER, impulse noise protection, and the like, of the applications being transported. Similarly, a coding module, which can be a portion of the shared processing module 110, can be shared between any one or more of the latency paths. This sharing can be based on requirements such as data rate, latency, BER, impulse noise protection, and the like, of the applications being transported.

For example, an exemplary transceiver could comprise a shared interleaver/deinterleaver memory and could be designed to allocate a first portion of the shared memory 120 to an interleaver, such as interleaver 216 in the transmitter portion of the transceiver and allocate a second portion of the shared memory 120 to a deinterleaver, such as 316, in the receiver portion of the transceiver.

Alternatively, for example, an exemplary transceiver can comprise a shared interleaver/deinterleaver memory, such as shared memory 120, and be designed to allocate a first portion of shared memory 120 to a first interleaver, e.g., 216, in the transmitter portion of the transceiver and allocate a second portion of the shared memory to a second interleaver, e.g., 226, in the transmitter portion of the transceiver.

Alternatively, for example, an exemplary transceiver can comprise a shared interleaver/deinterleaver memory and be designed to allocate a first portion of the shared memory 120 to a first deinterleaver, e.g., 316, in the receiver portion of the transceiver and allocate a second portion of the shared memory to a second deinterleaver, e.g., 326, in the receiver portion of the transceiver. Regardless of the configuration, in general any interleaver or deinterleaver, or grouping thereof, be it in a transmitter portion or receiver portion of the transceiver, can be associated with a portion of the shared memory 120.

Establishment, configuration and usage of shared resources is performed in the following exemplary manner. First, and in cooperation with the path module 140, the number of transmitter and receiver latency paths (N) is determined. The parameter determination module 130 then analyses one or more parameters such as data rate, transmitter data rate, receiver data rate, impulse noise protection, bit error rate, latency, or the like. Based on one or more of these parameters, the allocation module 150 allocates a portion of the shared memory 120 to one or more of the interleaver and/or deinterleavers, or groupings thereof. This process continues until the memory allocation has been determined and assigned to each of the N latency paths.

Having determined the memory allocation for each of the latency paths, and in conjunction with the shared resource management 160, the transceiver 100 transmits to a second transceiver one or more of the number of latency paths (N), the maximum interleaver memory for any one or more of the latency paths and/or the maximum total and/or shared memory for all of the latency paths.

Three examples of sharing interleaver/deinterleaver memory and coding processing in a transceiver are described below. The latency paths in these examples can be in the transmitter portion of the transceiver or the receiver portion of the transceiver.

EXAMPLE #1

A first transmitter portion or receiver portion latency path may carry data from a video application, which needs a very low BER but can tolerate higher latency. In this case, the video will be transported using an latency path that has a large amount of interleaving/deinterleaving and coding (also known as Forward Error Correction (FEC) coding). For example, the latency path may be configured with Reed-Solomon coding using a codeword size of 255 bytes (N=255) with 16 checkbytes (R=16) and interleaving/deinterleaving using an interleaver depth of 64(D=64). This latency path will require N*D=255*64=16Kbytes of interleaver memory at the transmitter (or de-interleaver memory at the receiver). This latency path will be able to correct a burst of errors that is less than 512 bytes in duration.

A second transmitter portion or receiver portion latency path may carry an internet access application that requires a medium BER and a medium amount of latency. In this case, the internet access application will be transported using a latency path that has a medium amount of interleaving and coding. For example, the latency path may be configured with Reed-Solomon coding using a codeword size of 128 bytes (N=128) with 8 checkbytes (R=8) and interleaving using an interleaver depth of 16 (D=32). This latency path will require N*D=128*32=4 Kbytes of interleaver memory and the same amount of deinterleaver memory. This latency path will be able to correct a burst of errors that is less than 128 bytes in duration.

A third transmitter portion or receiver portion latency path may carry a voice telephony application, which needs a very low latency but can tolerate BER. In this case, the video will be transported using an latency path that has a large amount of interleaving and coding. For example, the third transmitter portion or receiver portion latency path may be configured with no interleaving or coding which will result in the lowest possible latency through the latency path but will provide no error correction capability.

According to the principles of this invention, a system carrying the three applications described above in Example #1, would have three latency paths that share one memory space containing at least (16+4)=20 Kbytes. The three latency paths also share a common coding block that is able to simultaneously encode (in the transmitter portion) or decode (in a receiver portion) two codewords with N=255/R=16 and N=128/R=8.

According to an exemplary embodiment of this invention, the latency paths can be reconfigured at initialization or during data transmission mode (also known as SHOWTIME in ADSL and VDSL transceivers). This would occur if, for example, the applications or application requirements were to change.

EXAMPLE #2

If instead of 1 video application, 1 internet application and 1 voice application, there were 3 internet access applications then the transmitter portion and/or receiver portion latency paths would be reconfigured to utilize the shared memory and coding module in a different way. For example, the system could be reconfigured to have 3 transmitter portion or receiver portion latency paths, with each latency path being configured with Reed-Solomon coding using a codeword size of 128 bytes.(N=128) with 8 checkbytes (R=8) and interleaving using an interleaver depth of 16 (D=32). Each latency path will require N*D=128*32=4 Kbytes of interleaver memory and each block will be able to correct a burst of errors that is less than 128 bytes in duration. Based on the example of carrying the three internet access applications described, the three latency path share one memory space containing at least 3*4=12 Kbytes. Also the three latency paths share a common coding block that is able to simultaneously encode (on the transmitter side) or decode (on the receiver side) three codewords with N=128/R=16, N=128/R=8 and N=128/R=8.

EXAMPLE #3

The system could be configured to carry yet another set of applications. For example, the latency paths could be configured to carry 2 video applications. In this case only 2 transmitter portion or receiver portion latency paths are needed, which means that the third latency path could be simply disabled. Also, assuming that the memory is constrained based on the first example above, then the maximum shared memory for these 2 latency paths is 20 kBytes. In this case, the system could be reconfigured to have 2 latency paths, with each block being configured with Reed-Solomon coding using a codeword size of 200 bytes (N=200) with 10 checkbytes (R=10) and interleaving/deinterleaving using an interleaver depth of 50 (D=50). Each latency path will require N*D=200*50=10 Kbytes of interleaver memory and each block will be able to correct a burst of errors that is less than 250 bytes in duration. This configuration results in 20K of shared memory for both latency paths, which is the same as in the first example. In order to stay within the memory constraints of the latency paths, the error correction capability for each latency path is decreased to 250 bytes from 512 bytes in Example #1.

Another aspect of this invention is the how FCI configuration information is transmitted between a first modem and a second modem. FCI configuration information will depend on the requirements of the applications being transported over the DSL connection. This information may need to be forwarded during initialization in order to initially configure the DSL connection. This information may also need to be forwarded during SHOWTIME in order to reconfigure the DSL connection based on a change in applications or the application requirements.

According to one embodiment, a first modem determines the specific FCI configuration parameters, e.g, N, D, R as defined above, needed to meet specific application requirements, such as latency, burst error correction capability, etc. In order to determine the FCI configuration parameters, the first modem must know what are the capabilities of a second modem. For example, the first modem must know how many latency paths (FCI blocks) the second modem can support. Also the first modem must know the maximum amount of interleaver memory for each transmitter latency path. In addition, since the transmitter latency paths may share a common memory space the first modem must know the total shared memory for all transmitter latency paths. This way the first modem will be able to choose a configuration that can meet application requirements and also meet the transmitter portion latency path capabilities of the second modem.

For example, using values from examples above, a first transceiver could send a message to a second transceiver during initialization or during SHOWTIME containing the following information:

Number of supported transmitter and receiver latency paths=3
Max Interleaver Memory for latency path #1=16 Kbytes
Max Interleaver Memory for latency path #2=16 Kbytes
Max Interleaver Memory for latency path #3=16 Kbytes
Maximum total/shared memory for all latency paths=20 kBytes Based on this information, and the application requirements, the first transceiver would select latency path settings. For example, if the applications are 1 video, 1 internet access and 1 voice application, the first transceiver could configure 3 latency paths as follows:

latency path #1—Video: N=255, R=16, D=64
latency path #2—Video: N=128, R=8, D=32
latency path #3—Video: N=0, R=0, D=1 (no coding or interleaving)

This would result in a total interleaver memory of 20 kbytes.

Alternatively, if for example, there are only 2 video applications, the first transceiver could configure 2 latency paths as follows:

latency path #1—Video: N=200, R=10, D=50
latency path #2—Video: N=200, R=10, D=50
latency path #3—Video: N=0, R=0, D=1 (no coding or interleaving)

This would also result in a total interleaver memory of 20 kbytes.

Alternatively, the second transceiver can determine the specific FCI configuration parameters, e.g., N, D, R as defined above, needed to meet specific application requirements, such as latency, burst error correction capability, etc. As described above for the first transceiver, in order to determine the FCI configuration parameters, the second transceiver must first know what are the capabilities of the first transceiver. In this case, the first transceiver would send a message to the second transceiver containing the information described above and based on this information and the application requirements the second transceiver would select latency path settings.

Figure 2:
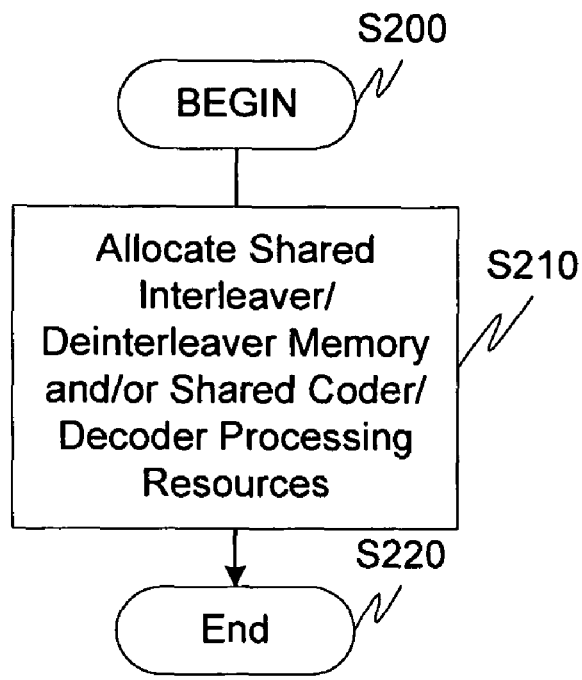
FIG. 2 is a flowchart outlining an exemplary method of sharing resources according to this invention.

FIG. 2 outlines an exemplary method of allocating shared memory in a transceiver. More specifically, control begins in step S200 and continues to step S210. In step S210, one or more of shared interleaver/deinterleaver memory and/or shared coder/decoder processing resources are allocated to one or more latency paths, in a transceiver. Control then continues to step S220 where the control sequence ends.

Figure 3:
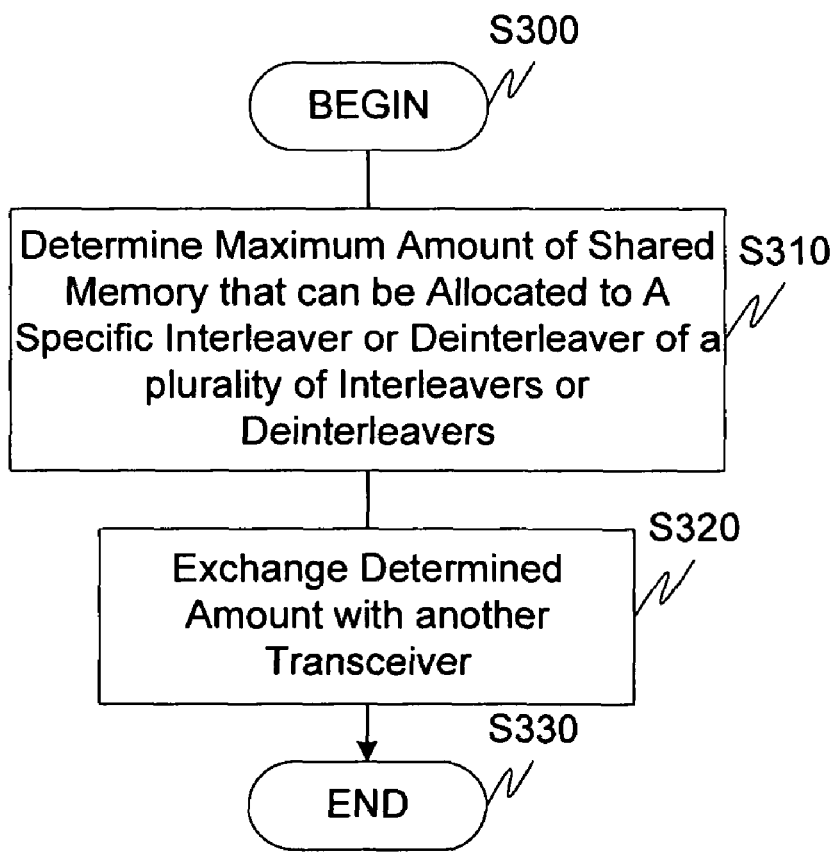
FIG. 3 is a flowchart outlining an exemplary method of determining a maximum amount of shared memory according to this invention.

FIG. 3 outlines an exemplary method of exchanging shared resource allocations according to an exemplary embodiment of this invention. In particular, control begins in step S310. In step S310, a maximum amount of shared memory that can be allocated to a specific interleaver or deinterleaver of a plurality of interleavers or deinterleavers in a transceiver is determined. Next, in step S320, the determined maximum amount for one or more of the deinterleavers and/or interleavers is transmitted to another transceiver. Messages containing additional information can also be transmitted to the other transceiver and/or received from the other transceiver. Control then continues to step S330 where the control sequence ends.

Figure 4:
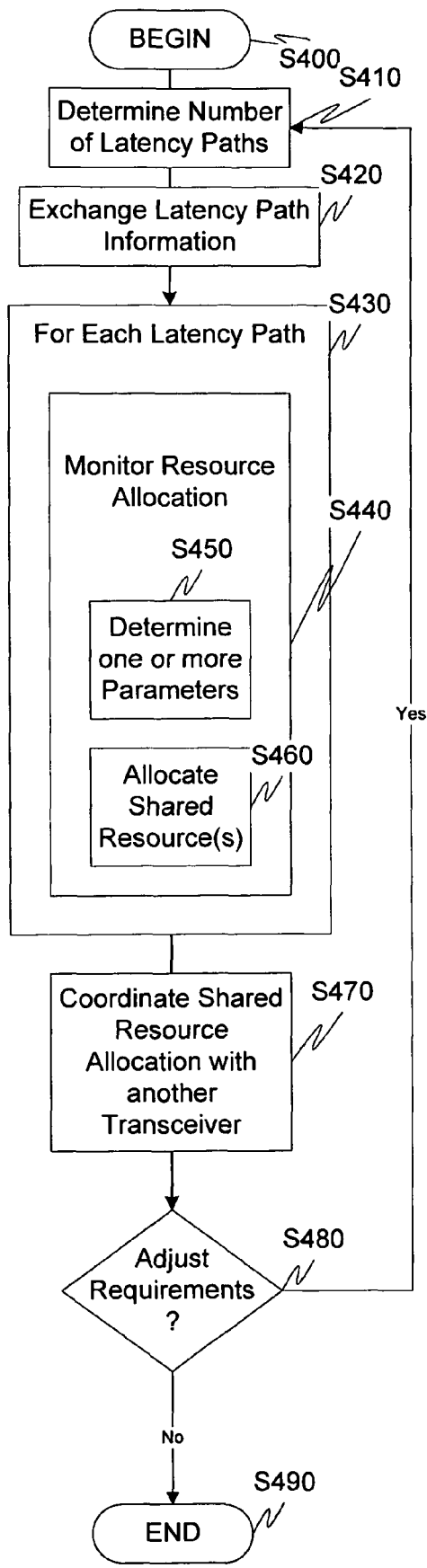
FIG. 4 is a flowchart outlining an exemplary resource sharing methodology according to this invention.

FIG. 4 outlines an exemplary procedure for resource sharing according to an exemplary embodiment of this invention. In particular, control begins in step S400 and continues to step S410. In step S410, the number of latency paths are determined. Then, in step S420, the latency path information (FCI block information) is transmitted to another transceiver. Messages containing additional information can also be transmitted to the other transceiver and/or received from the other transceiver. This information can be used to, for example, assist with the determination of memory allocation in the transceiver. Moreover, the messages received from the other transceiver could specify what the memory allocation is to be based on, for example, the number of latency paths, memory allocation in the remote transceiver and required applications. Control then continues to step S430.

In step S430, and for each latency path, the steps in step 440 are performed.

In step S440, and while monitoring of allocation of resources is being performed, steps 450 and 460 are performed. More specifically, in step S450, one or more parameters associated with the communication system are determined. Then, in step S460, shared resources are allocated based on one or more of the communication parameters. Control then continues to step S470.

In step S470, the allocation of shared resources is communicated to another transceiver. Next, in step S480, a determination is made as to whether there is a change in communications that would require the adjustment of the shared resource allocation. Examples of changes in communications conditions include a change in applications being transported over the system and/or changes in the channel condition, etc. If adjustments are required, control jumps back to step S410. Otherwise, control jumps to step S490 where the control sequence ends.

The above-described system can be implemented on wired and/or wireless telecommunications devices, such a modem, a multicarrier modem, a DSL modem, an ADSL modem, an XDSL modem, a VDSL modem, a linecard, test equipment, a multicarrier transceiver, a wired and/or wireless wide/local area network system, a satellite communication system, a modem equipped with diagnostic capabilities, or the like, or on a separate programmed general purpose computer having a communications device or in conjunction with any of the following communications protocols: CDSL, ADSL2, ADSL2+, VDSL1, VDSL2, HDSL, DSL Lite, IDSL, RADSL, SDSL, UDSL or the like.

Additionally, the systems, methods and protocols of this invention can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software that can be stored on a storage medium, executed on programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that there has been provided, in accordance with the present invention, systems and methods for sharing resources. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

The invention claimed is:

1. A method of allocating shared memory in a transceiver comprising:

transmitting or receiving, by the transceiver, a message during initialization specifying a maximum number of bytes of memory that are available to be allocated to an interleaver;

determining, at the transceiver, an amount of memory required by the interleaver to interleave a first plurality of Reed Solomon (RS) coded data bytes within a shared memory;

allocating, in the transceiver, a first number of bytes of the shared memory to the interleaver to interleave the first plurality of Reed Solomon (RS) coded data bytes for transmission at a first data rate, wherein the allocated memory for the interleaver does not exceed the maximum number of bytes specified in the message;

allocating, in the transceiver, a second number of bytes of the shared memory to a deinterleaver to deinterleave a second plurality of RS coded data bytes received at a second data rate; and interleaving the first plurality of RS coded data bytes within the shared memory allocated to the interleaver and deinterleaving the second plurality of RS coded data bytes within the shared memory allocated to the deinterleaver, wherein the shared memory allocated to the interleaver is used at the same time as the shared memory allocated to the deinterleaver.

2. The method of claim 1, wherein the determining is based on an impulse noise protection requirement.

3. The method of claim 1, wherein the determining is based on a latency requirement.

4. The method of claim 1, wherein the determining is based on a bit error rate requirement.

5. A method of allocating shared memory in a transceiver comprising:
- transmitting or receiving, by the transceiver, a message during initialization specifying a maximum number of bytes of memory that are available to be allocated to a deinterleaver;
- determining, at the transceiver, an amount of memory required by the deinterleaver to deinterleave a first plurality of Reed Solomon (RS) coded data bytes within a shared memory;
- allocating, in the transceiver, a first number of bytes of the shared memory to the deinterleaver to deinterleave a first plurality of Reed Solomon (RS) coded data bytes for transmission at a first data rate, wherein the allocated memory for the deinterleaver does not exceed the maximum number of bytes specified in the message;
- allocating, in the transceiver, a second number of bytes of the shared memory to an interleaver to interleave a second plurality of RS coded data bytes received at a second data rate; and
- deinterleaving the first plurality of RS coded data bytes within the shared memory allocated to the deinterleaver and interleaving the second plurality of RS coded data bytes within the shred memory allocated to the interleaver, wherein the shared memory allocated to the deinterleaver is used at the same time as the shared memory allocated to the interleaver.

6. The method of claim 5, wherein the determining is based on an impulse noise protection requirement.

7. The method of claim 5, wherein the determining is based on a latency requirement.

8. The method of claim 5, wherein the determining is based on a bit error rate requirement.

\* \* \* \* \*

UNITED STATES PATENT AND TRADEMARK OFFICE
CERTIFICATE OF CORRECTION

| | |
|---|---|
| PATENT NO. | : 7,831,890 B2 |
| APPLICATION NO. | : 11/246163 |
| DATED | : November 9, 2010 |
| INVENTOR(S) | : Marcos C. Tzannes et al. |

Page 1 of 1

It is certified that error appears in the above-identified patent and that said Letters Patent is hereby corrected as shown below:

In the claims:

In column 11, claim 5, line 18, delete "transmission" and insert -- reception --

In column 12, claim 5, line 3, delete "received" and insert -- transmitted --

In column 12, claim 5, line 8, delete "shred" and insert -- shared --

Signed and Sealed this
Eighth Day of February, 2011

David J. Kappos
*Director of the United States Patent and Trademark Office*